US007016860B2

(12) United States Patent
Modani et al.

(10) Patent No.: US 7,016,860 B2
(45) Date of Patent: Mar. 21, 2006

(54) HONORING OF ELECTRONIC COUPONS

(75) Inventors: Natwar Modani, New Delhi (IN); Parul A. Mittal, New Delhi (IN); Rahul Garg, Ghaziabad (IN); Alok Aggarwal, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 1037 days.

(21) Appl. No.: 09/782,934

(22) Filed: Feb. 13, 2001

(65) Prior Publication Data

US 2002/0147636 A1 Oct. 10, 2002

(51) Int. Cl.
*G06F 17/60* (2006.01)

(52) U.S. Cl. .............................. 705/14; 705/1; 705/26; 705/27

(58) Field of Classification Search ................. 705/14, 705/1, 25, 27
See application file for complete search history.

(56) References Cited

U.S. PATENT DOCUMENTS

| 5,185,695 | A | 2/1993 | Pruchnicki |
| 5,390,991 | A | 2/1995 | Tozu et al. |
| 5,420,606 | A | 5/1995 | Begum et al. |
| 5,502,636 | A | 3/1996 | Clarke |
| 5,727,153 | A | 3/1998 | Powell |
| 5,855,007 | A | 12/1998 | Jovicic et al. |
| 5,905,246 | A | 5/1999 | Fajkowski |
| 5,909,673 | A | 6/1999 | Gregory |
| 5,923,016 | A | 7/1999 | Fredregill et al. |
| 5,924,080 | A | 7/1999 | Johnson |
| 6,002,771 | A | 12/1999 | Nielsen |
| 6,185,541 | B1 * | 2/2001 | Scroggie et al. ............... 705/14 |
| 6,505,773 | B1 * | 1/2003 | Palmer et al. ............... 235/380 |

FOREIGN PATENT DOCUMENTS

| JP | 2003-501712 | | 1/2003 |
| WO | WO 00/74300 A1 | | 12/2000 |
| WO | WO 200120527 | * | 3/2001 |

OTHER PUBLICATIONS

"Coupon Chaos: Plea to Stores", Super Marketing, n1014, p8(2), Mar. 20, 1992, Dialog File 148, Record # 05896417.*
"Sales Promotions on the Internet", Manoj Kumar, Anand Rangachari, Anant Jhingran, and Rakesli Mohan, IBM T.J. Watson Research Center, Proceedings of the 3rd USENIX Workshop on Electronic Commerce, Boston, Massachusetts, Aug. 31–Sep. 3, 1998, 11 pages.

* cited by examiner

*Primary Examiner*—James W. Myhre
*Assistant Examiner*—Khanh H. Le
(74) *Attorney, Agent, or Firm*—McGinn & Gibb, PLLC; T. Rao Coca, Esq.

(57) ABSTRACT

An electronic coupon, an electronic commerce system, and a method for the honoring of electronic coupons utilizing computing equipment are disclosed. In the method, an issuing party issues an electronic coupon to a customer. The customer presents the coupon for redemption to a redemption party. The redemption party transmits the coupon to an authentication party for authentication. If authentic, the authentication party charges the redemption party a fee and passes that fee to the issuing party. The redemption party honors the coupon for the customer and seeking reimbursement of the fee from the issuing party. The electronic coupon has a plurality of data fields, including: a coupon identifier, x, a first one-way hash function field, f(x), and a secure signature field.

18 Claims, 2 Drawing Sheets

HONORING OF ELECTRONIC COUPONS

FIELD OF THE INVENTION

The present invention relates to the field of electronic commerce, and particularly to so-called coupons, issued to buyers (i.e. customers or consumers) which are honored (or redeemed) by providers of goods or services (i.e. sellers).

BACKGROUND OF THE INVENTION

Various sales promotion techniques or tools exist, such as prizes, contests, sweepstakes, games, free samples, product warranties, tie-in promotions, loyalty points, cross-sell, up-sell, premium memberships, card discounts, and gift certificates. These have been used for a long time to retain loyal customers, to increase the repurchase rate of occasional buyers, to attract new buyers, to manage inventory, and to gain market share. In more recent times, such techniques have been embodied in electronic form. All such techniques and tools, and others such as instant discount (which is similar to haggling or negotiations as occurs in conventional commerce), are herein referred to as "coupons".

There are different classes of coupons based upon the identity issuing authority (i.e. manufacturer or retailer), whether the coupon is targeted to a set of potential customers or untargeted, and whether the number of coupons to be distributed is limited or unlimited. The various classes of coupons serve different purposes. For example, coupons issued by a manufacturer to a group of loyal customers in limited numbers could be intended to retain those loyal customers. Coupons issued by a manufacturer in untargeted mass distribution could be intended to attract buyers for a new product, and coupons issued by a retailer in untargeted limited distribution could be intended to attract customers to a retail outlet.

Normally, when a manufacturer or a retailer issues coupons on a product or a service, a coupon is expected to be used only for that product or service. To save coupon creation and management costs, or to attract new buyers, a manufacturer or retailer may decide to honor the coupons issued by another party. This is referred to as cross-coupon honoring.

In a generic form, electronic coupon systems must allow a buyer to collect electronic coupons while doing on-line shopping (or otherwise visiting an e-commerce site) from various e-commerce sites, and to redeem these coupons on-line at any e-commerce site or physical store, satisfying the purchase conditions of the offer.

Consider the case where 'A' and 'B' are two competing airlines, and Airline 'A' issues electronic discount coupons to its frequent flying customers. The Airline 'B', as a counter-strategy, announces that Airline "B" will also honor the coupons issued by the Airline 'A' (i.e. it will give discounts to the customers carrying the Airline 'A' coupon for buying Airline 'B' tickets). In the process, Airline 'B' stands to gain more than the Airline 'A', as it saves the coupon creation and management costs and is also able to target the competitor's loyal customers. Clearly, Airline 'A' would find cross-coupon honoring of its coupons undesirable and disadvantageous. Thus there is a need for cross-coupon honoring prevention solutions.

From a different perspective, cross-coupon honoring is also disadvantageous to Airline "B". In particular, the redeeming e-commerce site (eg. Airline 'B') still has to verify that the electronic coupon is valid (i.e. it was indeed issued by the competitor), the terms and conditions have not been altered in some way, and the coupon has not already been redeemed.

Thus, a need clearly exists for an improved system of honoring coupons overcoming or at least ameliorating one or more disadvantages of conventional approaches described hereinbefore.

SUMMARY OF THE INVENTION

The gist of the invention is to charge an authentication fee for each positive coupon verification. Such a fee is reimbursed only to a legitimate redemption party. In this way a cross-coupon honoring party is discouraged.

The invention discloses a method for the honoring of electronic coupons utilizing computing equipment, comprising the steps of:

(a) an issuing party issuing an electronic coupon to a customer;

(b) said customer presenting said coupon for redemption to a redemption party;

(c) said redemption party transmitting said coupon to an authentication party for authentication;

(d) if authentic, said authentication party charging said redemption party a fee and passing that fee to said issuing party; and (e) said redemption party honoring said coupon for said customer and seeking reimbursement of said fee from said issuing party.

The invention further discloses an electronic coupon, having a plurality of data fields, including:

a coupon identifier, x;

a first one-way hash function field, $f(x)$; and a secure signature field including a secure second one-way hash function, $g(x)$.

The invention yet further discloses an electronic commerce system, having electronic coupon issuance and redemptions, comprising:

one or more coupon issuing parties issuing electronic coupons to customers;

one or more redemption parties being electronically presented with said coupons for redemption; and an authentication party being in communication with said issuing parties and said redemption parties;

and wherein, upon being presented with a said coupon, said redemption party transmits said coupon to said authentication party for authentication, and if authenticated, said authentication party charges said redemption party a fee and passes that fee to said issuing party, the redemption party then honoring said coupon and seeking reimbursement from said issuing party.

BRIEF DESCRIPTION OF THE DRAWINGS

Embodiments of the invention will now be described with reference to the accompanying drawings, in which.

DETAILED DESCRIPTION INCLUDING BEST MODE

For the purpose of explanation, the specific example of electronic coupons issued by a manufacturer ("manufacturer coupons") will be given, however it is to be understood that the invention also applies to coupons issued by retailers ("retail coupons"). A coupon-issuing party is known generically as an "issuing party".

Figure 1:
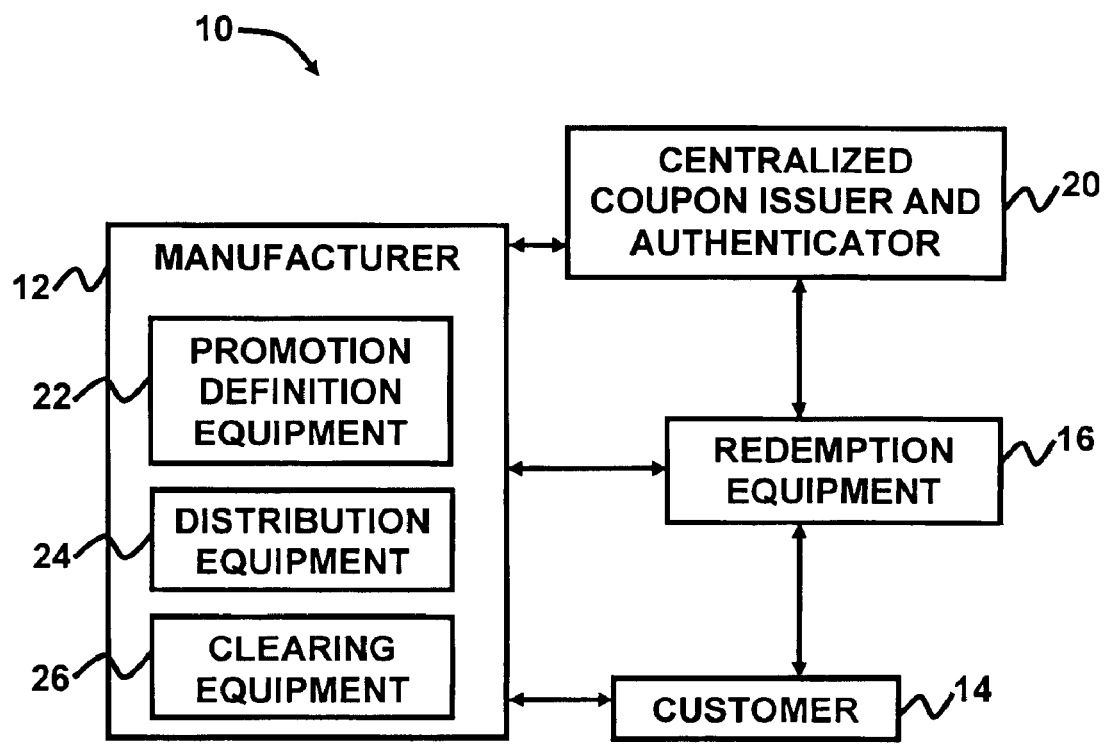
FIG. 1 is a schematic block diagram of an on-line coupon verification system.

FIG. 1 is a schematic block diagram of a centralised on-line coupon verification system 10. A manufacturer 12 is conducting a coupon promotion. A customer 14 receives one or more electronic coupons from the manufacturer 12 and seeks to redeem the coupon with an electronic Retailer 16. The customer 14 is offered a legitimate product/service that is being discounted by the issuing manufacturer's coupon. FIG. 1 also shows the engagements between the parties, that occur via any suitable communications network. A Centralised Coupon Issuer and Authenticator (CCIA) 20 is a third party service whose role will now be described.

The CCIA 20 provides coupon creation and verification service to a plurality of manufacturers for their promotions. It generates unforgeable blank coupons in response to a request from a manufacturer. The coupon has the following properties:

a. When the coupon is presented to the CCIA at a later stage, the CCIA can recognize that the coupon was indeed produced by the CCIA.
 b. No other entity can produce such a stream of bytes, that will be recognized by the CCIA as a valid coupon, within a reasonable probability.

The CCIA 20 also maintains a central database of the coupons redeemed so far. For each coupon validation request from a redeeming party, it checks if the coupon has been used earlier and returns a validity certificate to the retailer accordingly.

The manufacturer 12 is constituted by three elements: a promotion definition equipment 22, a distribution equipment 24, and a clearing equipment 26.

The promotion definition equipment 22 is usually owned or operated by the manufacturer, or their agent undertaking a sales promotion on their behalf. It is used by the manufacturer to define a promotion scheme. Promotion scheme parameters comprise the item, or collective of items to be discounted, the amount of discount, the nature of the discount (e.g. free gifts, price packs, loyalty points and order discount), a market segment for the promotion scheme, the duration of the promotion scheme, appropriate instance to offer the discount, how to offer the discount, and so on.

The distribution equipment 24 also usually is owned or operated by the manufacturer, or their agent doing sales promotion on their behalf. The equipment requests the CCIA 20 for a certain number of coupons for a promotion scheme. It then writes the promotion specific information on the coupons received from CCIA 20 and digitally signs the coupon to make it an authentic certificate. It offers the customized coupons to a plurality of customers depending on customer profile and promotion scheme.

The clearing equipment 26 receives redeemed coupons, along with their validity certificate and other relevant information like proof of sale or sales invoice number, from participating retailers. It operates to verify the authenticity of coupons and corresponding validity certificate. It then transfers the required amount to the appropriate retailer.

The retailer's redemption equipment 16 is usually owned by the retailer, which takes the coupons from the customer for redemption, verifies the authenticity of the coupons and obtains a "validity certificate" from the CCIA 20 before giving the discount to the customer.

Figure 2:
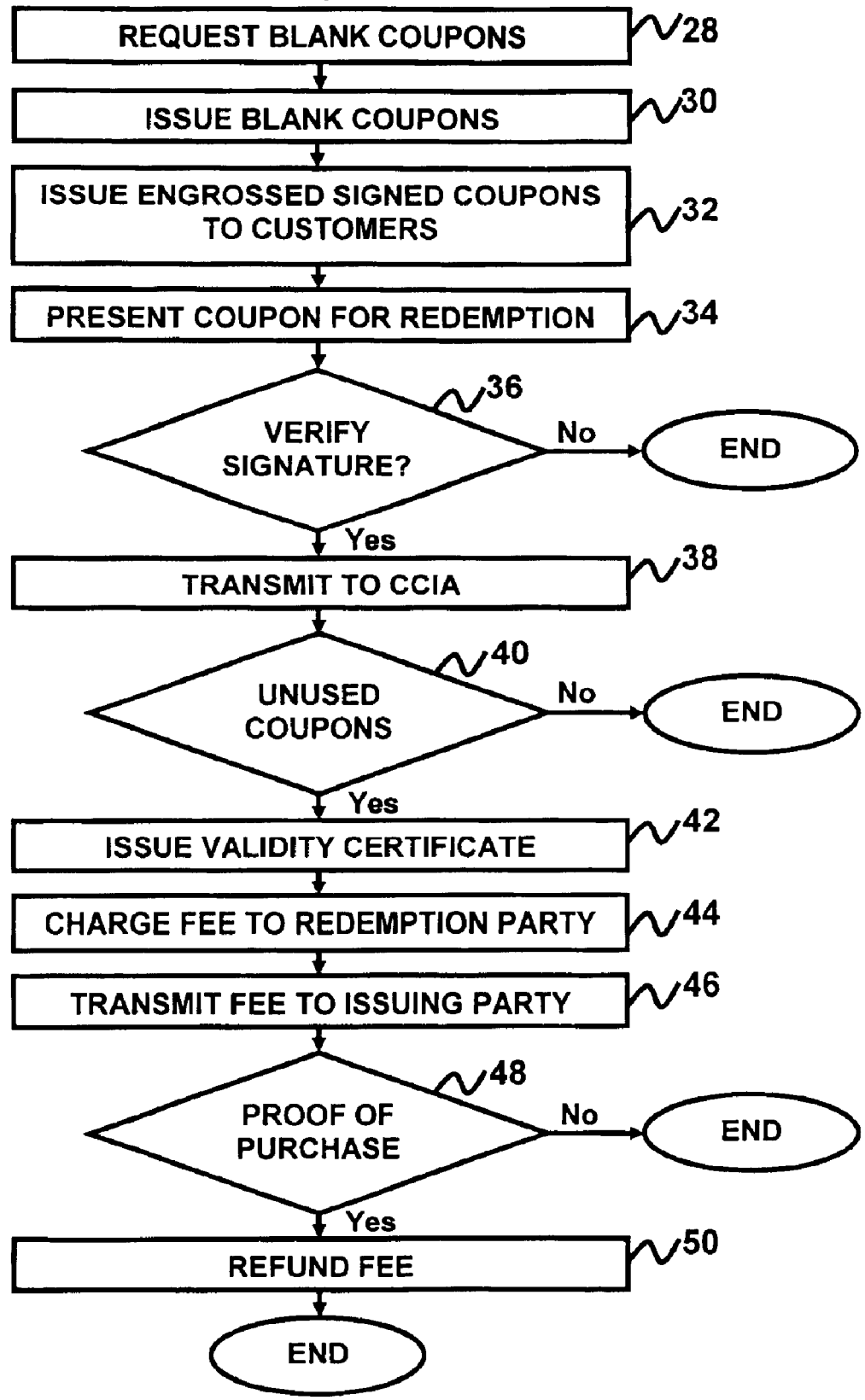
FIG. 2 is a block flow diagram showing an electronic coupon issuance and redemption scenario 2.

The practise of the invention will now be described, in general terms with reference to FIG. 2.

The manufacturer 12 decides to implement a promotion scheme. The promotion definition equipment 22 sends a request to obtain blank coupons to the CCIA 20, in step 28, as message 1. The definition equipment 22 may be triggered by the manufacturer, a periodic timer or an external event to obtain blank coupons from the CCIA 20 before issuing the coupon to a customer. It may alternatively obtain the blank coupon from the CCIA 20 at the time of offering a coupon to a customer.

In step 30, the CCIA creates and returns the requested number of blank unforgeable coupons, being message 2. A blank coupon consists of a coupon identifier denoted by x, and one way hash functions of x, say f(x) and g(x). Examples of suitable hash functions are the standard algorithms such as SHA, MD5, MD2, etc. These one-way hash functions are known only to the CCIA 20 to ensure that a blank coupon cannot be forged. The distribution equipment 24 then adds promotion details obtained from the promotion definition equipment to the blank coupons. The promotion details are referred to as the customization_information. The distribution equipment digitally signs g(x) and the customization information. Thus the coupon offered to the customer comprises of x, f(x), sign_manufacturer(g(x), customization_info_signed_part, optional_info). This is message 3. The optional information inside the signed portion is the optional information from message 2.

The purpose of this format is to ensure that no one but the CCIA 20 shall be able to verify the authenticity of the coupon. The coupon comprises of a signed part and an unsigned part. The signed part can be verified by anyone knowing the manufacturer's public key, without the help of CCIA. But the unsigned part (i.e. x, f(x)) can be authenticated only by the CCIA, as only the CCIA knows the function f(x). This explains the reason to keep x, f(x) outside the manufacturer's signature. The reason for keeping g (x) inside the manufacturer signature is to prevent coupon mismatch. For instance, a customer could take the signed part of one coupon and attach it to the unsigned part of another coupon to make a new coupon. This new coupon will look like any valid coupon to the retailer and the CCIA. This allows the defaulter to take a coupon with high discount and replace its x, f(x), g(x) part by a low discount value coupon's x', f(x') and g (x'). If the g(x) is unsigned, then CCIA 20 cannot prevent coupon mismatch frauds. Whereas if the g(x) is inside the signed part, the mismatch can be detected by checking g(x) inside the manufacturer's signature and f (x) outside the signature.

The manufacturer 12 now distributes the coupons to the appropriate customers in step 32.

The customer 'takes' the coupon to the Retailer 16, and presents the coupon to avail of the discount it offers, in step 34. The Retailer, in step 36, verifies the manufacturer's signature on the coupon, to ensure the coupon has not been tampered with. This verification is performed by public key cryptography. The manufacturer signs using his private key and the retailer verifies the signature and the integrity of the content signed by using the manufacturer's public key. The retailer then sends the coupon to the CCIA 20, in step 38. In step 40, the CCIA first checks whether the received f(x) and g(x) are indeed the correct hash functions of the received x. If this is correct, it implies that the coupon is authentic. Then it determines whether the coupon with the identifier 'x' has already been redeemed. If it has not been redeemed earlier, the coupon is entitled for the mentioned discount, and the CCIA 20 returns a positive validity certificate to the Retailer 16 as message 6 in step 42. If it has been redeemed earlier the CCIA returns a negative validity certificate to the retailer. The Retailer, in redeeming the coupon, now has a validity certificate from the CCIA, meaning that there is no chance of fraudulent redemption, however, the issuing manufacturer 12 is now vulnerable to cross-coupon honoring attacks.

To prevent cross-coupon honoring, in step 44, the issuing manufacturer 12 authorises the CCIA 20 to charge an amount $X (that may depend on the coupon value) from the redeeming Retailer 16. In step 46, the CCIA 20 transfers this amount to the issuing manufacturer 12. The retailer may now give the customer the discount for the requested goods or services.

A clearance process step 48, then occurs, where proof of purchase must be established. The retailer 16 presents redeemed coupons to the manufacturer's clearing equipment 26 along with the respective certificate. If decision step 48 returns true (yes), processing continues in step 50, the $X is then refunded, together with the discounted amount. Processing then terminates. Otherwise, if decision step 48 returns false (no), processing terminates.

Consider, though, if the redeeming Retailer attempts to gain compensation from a competing manufacturer (i.e. the cross-coupon honoring manufacturer). In such a case there will be no proof of purchase (step 48), and the Retailer 16 has no motivation to reimburse Retailer A. Of course, the cross-coupon honoring manufacturer 22 may choose to reimburse Retailer A without proof of purchase or a validity certificate, but the reimbursement is not for the additional $X that Retailer A paid to the CCIA 20 for the validity certificate. If the manufacturer 22 attempts to reimburse the $X as well, this results in losses. Also, the Retailer could ask for any amount which may be >$X, compounding the losses.

The methodology described will not achieve its objective if the redeeming party doesn't need to go to the CCIA 20 for a validity certificate. The unforgeable blank coupon and the signed customised coupon should be such that coupon verification can not be done without the CCIA's involvement.

The message content in the centralised on-line verification system is described below. Here, the coupon id is denoted by 'x'. The functions f (x) and g (x) are one-way hash functions on the coupon id. Also, sign_identity (text) denotes text that has been digitally signed by the identity.

| Message Number | Message Content |
| --- | --- |
| Message 1 | number of coupons, optional_information |
| Message 2 | x, f(x), g(x), optional_information |
| Message 3 | x, f(x), customization_information_1, sign_manufacturer (g(x), customization_information_2, optional_information) |
| Message 4 | same as message 3. |
| Message 5 | same as message 3. |
| Message 6 | sign_CCIA(x, valid/invalid, time_stamp, optional_information) |

In another embodiment of this invention, the clearing equipment 26 may also know the one-way hash functions used by the CCIA 20. This will enable the clearing equipment 26 to authenticate the coupon presented for clearing, without having to go to the CCIA 20 for verifying coupon authenticity.

In another embodiment of this invention, the distribution equipment 24 splits the customization_information in two parts. The distribution equipment digitally signs g(x) and one part of the customization information. Thus the coupon offered to the customer comprises of x, f(x), unsigned part of customization_info, sign_manufacturer(g(x), customization_info_signed_part, optional_info). This is message 3. The optional info inside the signed portion is the optional information from message 2. The reason for keeping part of the customization information outside the manufacturer's signature is to increase the uncertainty about the coupon's genuineness for a cross-coupon manufacturer. The cross-coupon manufacturer can maintain a database of (x, f(x)) for the coupons redeemed so far. If complete customization information is kept inside the signature, the cross coupon manufacturer can be sure of the promotion parameters as they are inside the manufacturer's signature. But since it doesn't know the one-way hash functions f(x) and g(x), it cannot prevent double (or multiple) spending. The customers can make any combination of two numbers as x, f(x) and combine with the signed part to create a fake coupon.

At the other extreme, if all the customization information was kept outside the signature, then the cross-coupon manufacturer would not be sure about anything (i.e., discount amount, validity period, etc.) but the CCIA 20 also needs to know the unsigned customization information to be able to authenticate a coupon. The tradeoff here is the amount of customization information that CCIA needs to be aware of and the desired ambiguity of the coupon parameters to the cross coupon manufacturer.

In another embodiment of this invention, all the messages may carry time stamps in order to prevent the retailer/cross coupon honoring manufacturer from manipulating the documents for cross coupon honoring.

In another embodiment of this invention, the CCIA may be working only for one manufacturer.

In another embodiment of this invention, the promotion definition equipment 22, the distribution equipment 24, and the clearing equipment 26 may be operated by a third party for a plurality of manufacturers. Each manufacturer has an account with the service provider and uses the services from browser or such similar tool.

The foregoing describes only a few arrangements and embodiments of the claimed invention, and modifications and/or changes can be made thereto without departing from the scope and spirit of the invention, the arrangements and embodiments being illustrative and not restrictive.

For example, there can, in an electronic commerce system, be many issuing parties and many redeeming parties, such that certain redeeming parties will have redemption arrangements with certain of the issuing parties, and yet be discouraged from cross-coupon honoring.

We claim:

1. A method for honoring electronic coupons utilizing computing equipment, said method comprising:

an issuing party issuing an electronic coupon to a customer;

said customer presenting said coupon for redemption to a redemption party, said redemption party being non-competitive from said issuing party;

said redemption party transmitting said coupon to an authentication party for authentication, said authentication party being different than said issuing party;

said authentication party using said computing equipment to determine whether said coupon is authentic;

said authentication party charging said redemption party a fee upon determination that said coupon is authentic;

said authentication party passing said fee to said issuing party;

said redemption party honoring said coupon from said customer;

upon said honoring, said redemption party seeking reimbursement of said fee from said issuing party; and said issuing party reimbursing said fee to said redemption party.

2. The method of claim 1, wherein after said presenting, said method further comprising said redemption party verifying validity of said coupon with said issuing party.

3. The method of claim 2, further comprising establishing the validity of said coupon using an electronic signature.

4. The method of claim of claim 3, wherein in said establishing said electronic signature is achieved by public key cryptography.

5. The method of claim 1, wherein prior to said issuing, said method further comprising said authentication party issuing a plurality of blank said coupons to said issuing party for subsequent use.

6. The method of claim 5, wherein in said issuing a plurality of blank said coupons to said issuing party for subsequent use, said coupons include variable fields that are generated by one-way hash functions.

7. The method of claim 1, wherein in the determination of whether said coupon is authentic, said authentication party determines authenticity of a received coupon by checking whether one-way hash functions included in said coupons are valid.

8. The method of claim 7, wherein in the determination of whether said coupon is authentic, said authentication party further determines authenticity of said received coupon by checking whether said received coupon has been used before.

9. The method of claim 8, wherein in said determining, upon checking that said received coupon has not been used before, said authentication party issuing a validity certificate to said redeeming party.

10. The method of claim 7, wherein in said honoring, said redeeming party providing said issuing party with a proof of purchase of an item for which said coupon is being applied toward.

11. An electronic commerce system facilitating electronic coupon issuance and redemption, said electronic commerce system comprising:

at least one issuing party computing device adapted to issue an electronic coupon to a customer;

at least one redemption party computing device adapted to electronically receive said electronic coupon for redemption, said redemption party computing device being non-competitive from said issuing party computing device; and an authentication party computing device in communication with said issuing party computing device and said redemption party computing device, said authentication party computing device being different than said issuing party computing device;

wherein said redemption party computing device is adapted to transmit a received electronic coupon to said authentication party computing device for authentication, wherein said authentication party computing device is adapted to charge said redemption party computing device a fee and to pass said fee to said issuing party computing device, wherein said redemption party computing device being further adapted to honor said electronic coupon and seek reimbursement from said issuing party computing device, and wherein said issuing party computing device being further adapted to reimburse said fee to said redemption party computing device.

12. The electronic commerce system of claim 11, wherein said electronic coupon comprises:

a coupon identifier;

a coupon authentication verification function field; and a secure signature function field bearing a signature of an issuing party of said electronic coupon, wherein said coupon identifier and said coupon authentication verification function field are adapted to be verified only by said authentication party computing device.

13. The electronic commerce system of claim 12, wherein said electronic coupon further comprising a customizable information function field adapted to retain information maintained by said issuing party computing device and said authentication party computing device.

14. The electronic commerce system of claim 11, wherein said issuing party computing device comprises a promotion definition computing device adapted to define a promotion scheme for said issuing party computing device.

15. The electronic commerce system of claim 14, wherein said issuing party computing device further comprises a distribution computing device adapted to handle distribution of said electronic coupon to said customer based on said promotion scheme.

16. The electronic commerce system of claim 15, wherein said issuing party computing device further comprises a clearing computing device adapted to receive a redeemed electronic coupon from said customer.

17. The electronic commerce system of claim 11, wherein said authentication party computing device comprises a unique electronic identifier different from an electronic identifier of said issuing party computing device.

18. The electronic commerce system of claim 11, wherein said authentication party computing device comprises a database of redeemed electronic coupons.

* * * * *

Disclaimer

7,016,860 — Natwar Modani, New Delhi (IN); Parul A. Mittal, New Delhi (IN); Rahul Garg, Ghaziabad (IN); and Alok Aggarwal, Chappaqua, NY (US). HONORING OF ELECTRONIC COUPONS. Patent dated March 21, 2006. Disclaimer filed October 06, 2006, by the assignee, International Business Machines Corporation.

Hereby completely disclaims all of the claims of said patent.

*(Official Gazette November 25, 2008)*